United States Patent
Ikeda (10) Patent No.: US 9,087,292 B2
(45) Date of Patent: Jul. 21, 2015

(54) IMAGE PROCESSING APPARATUS, CONTROL METHOD, AND COMPUTER PROGRAM FOR DETECTING A FAILURE AND SHOWING A HANDLING PROCEDURE FOR ELIMINATING THE FAILURE

(71) Applicant: CANON KABUSHIKI KAISHA, Tokyo (JP)

(72) Inventor: Toru Ikeda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/091,512

(22) Filed: Nov. 27, 2013

(65) Prior Publication Data

US 2014/0153030 A1 Jun. 5, 2014

(30) Foreign Application Priority Data

Nov. 30, 2012 (JP) ................. 2012-262600

(51) Int. Cl.
*G06K 15/00* (2006.01)
*H04N 9/87* (2006.01)
*H04N 1/00* (2006.01)
*H04N 7/00* (2011.01)
*H04N 1/32* (2006.01)

(52) U.S. Cl.
CPC ............ *G06K 15/408* (2013.01); *H04N 1/00* (2013.01); *H04N 1/32657* (2013.01); *H04N 7/002* (2013.01); *H04N 9/87* (2013.01)

(58) Field of Classification Search
None
See application file for complete search history.

(56) References Cited

U.S. PATENT DOCUMENTS

| 4,475,806 | A | 10/1984 | Daughton et al. | 355/14 R |
| 6,185,379 | B1 * | 2/2001 | Lay et al. | 399/11 |
| 6,397,187 | B1 * | 5/2002 | Vriens et al. | 704/275 |
| 2003/0210659 | A1 * | 11/2003 | Chu et al. | 370/320 |
| 2004/0073934 | A1 * | 4/2004 | Deshpande et al. | 725/87 |

FOREIGN PATENT DOCUMENTS

| JP | 59-78372 A | 5/1984 |
| JP | 08-69223 A | 3/1996 |

* cited by examiner

*Primary Examiner* — Jeremiah Bryar
(74) *Attorney, Agent, or Firm* — Fitzpatrick, Cella, Harper & Scinto (57) ABSTRACT

An image processing apparatus detects a failure that has occurred, and determines whether or not the location at which the failure has been detected is in an accessory device attached to the body of an image processing apparatus. When the location at which the failure has been detected is in an accessory device, the image processing apparatus receives video data that shows a handling procedure for eliminating the failure that has occurred in the accessory device from a video distribution server and stores the data in a storage unit, and reproduces and displays the video data on a screen. Then, when the image processing apparatus detects that the above described failure has been eliminated, it erases the video data displayed on the above described screen from the storage unit.

16 Claims, 7 Drawing Sheets

IMAGE PROCESSING APPARATUS, CONTROL METHOD, AND COMPUTER PROGRAM FOR DETECTING A FAILURE AND SHOWING A HANDLING PROCEDURE FOR ELIMINATING THE FAILURE

BACKGROUND OF THE INVENTION

1. Field of the Invention

The present invention relates to an image processing apparatus, a control method, and a computer program.

2. Description of the Related Art

There has been conventionally proposed an image processing apparatus that displays information for prompting a user to do maintenance work for eliminating a failure that precludes printing on a screen when the failure has occurred. For example, Japanese Patent Application Laid-Open No. 59-78372 discloses an image processing apparatus that displays an operation procedure in the form of an illustration or message for clearing jams such as a paper jam, toner supply, or the like when the processing for clearing the jams become necessary. In addition, Japanese Patent Application Laid-Open No. 8-69223 discloses an image processing apparatus that reproduces and displays video data that shows a procedure for clearing a jam caused at a paper passage part, on an operation unit. Note that in the following description, a video that shows maintenance work for eliminating a failure is referred to as a "maintenance video".

In the image processing apparatus disclosed in Japanese Patent Application Laid-Open No. 8-69223, which reproduces and displays a maintenance video, the following situations may occur. Since video data has a large amount of data compared to a still image and character information, if an image processing apparatus has video data, a very large storage area is required. For example, in the case of uncompressed video data, when the image size is 720 dots wide×480 dots long, and 1 dot is 3 bytes (full color), then the data amount per a frame is about 1 MB. Moreover, when an image of 30 frames per second is displayed for 10 seconds, the data amount becomes 300 MB. The data amount can be reduced by compressing the video data or changing the frame rate, but the data amount is still large compared to a still image and character information.

In addition, an image processing apparatus can be equipped with various peripheral devices (accessory devices) such as a postprocessing device having a function such as bookbinding or cutting, and a paper feeding device for feeding papers. In the case of an image processing apparatus to/from which an accessory device(s) can be attached and detached, a failure can occur both in the body of the image processing apparatus and the accessory device(s). Therefore, an image processing apparatus to/from which an accessory device(s) can be attached and detached needs to hold in advance all maintenance videos corresponding to all peripheral devices that can be attached to the body of the image processing apparatus in order to reproduce and display a maintenance video that shows a procedure for eliminating a failure that has occurred. Accordingly, the image processing apparatus needs to have very large storage area.

SUMMARY OF THE INVENTION

The present invention provides an image processing apparatus to/from which an accessory device can be attached and detached and which reproduces and displays a video that shows a maintenance procedure for eliminating a failure that has occurred without requiring a very large storage area.

One embodiment of the image processing apparatus according to the present invention is an image processing apparatus that can communicate with a video distribution apparatus via a network. The image processing apparatus comprises: a detection unit configured to detect a failure that has occurred in the image processing apparatus; a first determination unit configured to determine whether or not the location at which the failure has been detected is in a peripheral device attached to the body of the image processing apparatus; a receiving unit configured to receive video data that shows a procedure of processing for eliminating the failure that has occurred in the peripheral device from the video distribution apparatus and to store the data in a storage unit when it is determined that the location at which the failure has been detected is in the peripheral device attached to the body of the image processing apparatus; and a display unit configured to reproduce and display the video data stored in the storage unit on a screen.

When a failure has occurred in a peripheral device, the image processing apparatus according to the present invention externally receives a maintenance video at the time when the failure has occurred and reproduces and displays the video. Therefore, the image processing apparatus according to the present invention can reproduce and display a video that shows a maintenance procedure for eliminating a failure that has occurred while a peripheral device is attached to the body of the image processing apparatus without requiring a very large storage area.

Further features of the present invention will become apparent from the following description of exemplary embodiments with reference to the attached drawings.

DESCRIPTION OF THE EMBODIMENTS

Hereinafter, preferred embodiments of the present invention will be described with reference to the attached drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
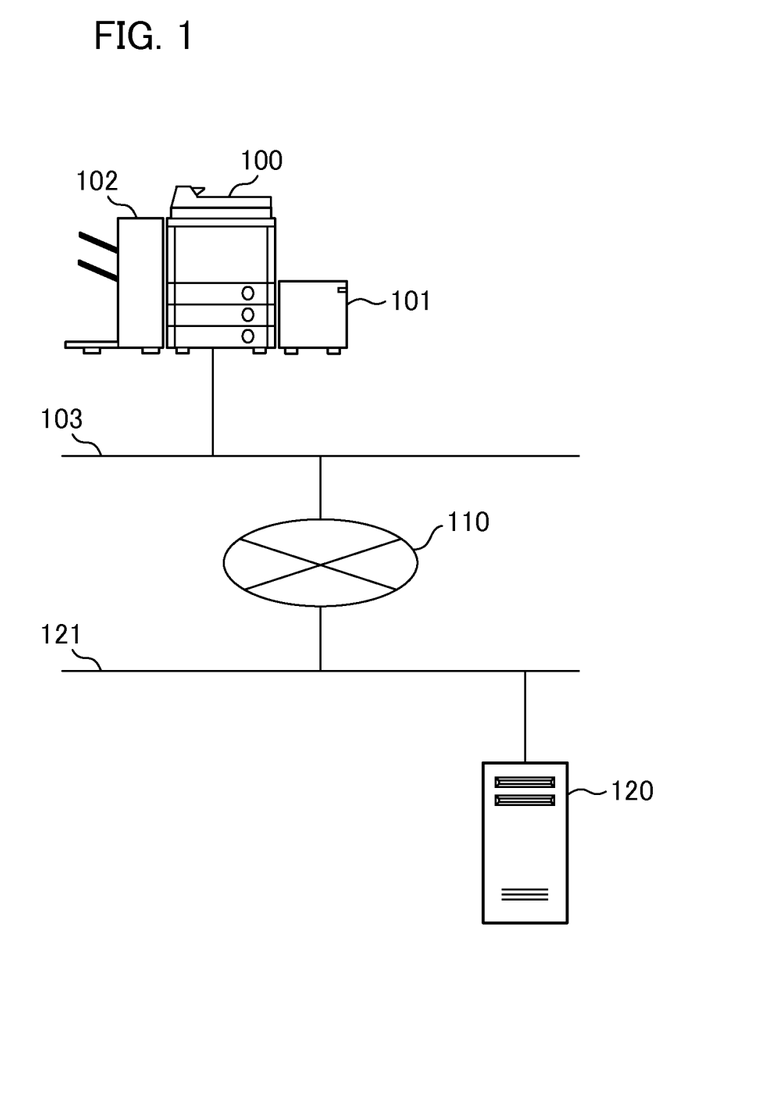
FIG. 1 is a diagram illustrating the configuration of a system according to a first embodiment.

FIG. 1 is a diagram illustrating the configuration of a system according to a first embodiment. The system shown in FIG. 1 includes an image processing apparatus 100 and a video distribution server 120. The image processing apparatus 100 and the video distribution server 120 can communicate with each other via a network i.e., LAN (Local Area Network) 103, Internet 110, and LAN 121.

The image processing apparatus 100 is an information processing apparatus that performs image processing (generation or output of image data, or the like). The image processing apparatus 100 is, for example, a printer or fax machine. The body of the image processing apparatus 100 is equipped with peripheral devices (accessory devices). In this example, the image processing apparatus 100 is equipped with a paper feeding deck 101 that is a paper feeding device for feeding sheets of paper and a finisher 102 that performs postprocessing such as stapling or sorting, as the accessory devices. The video distribution server 120 is a video distribution apparatus that distributes video data to the image processing apparatus 100.

Figure 2:
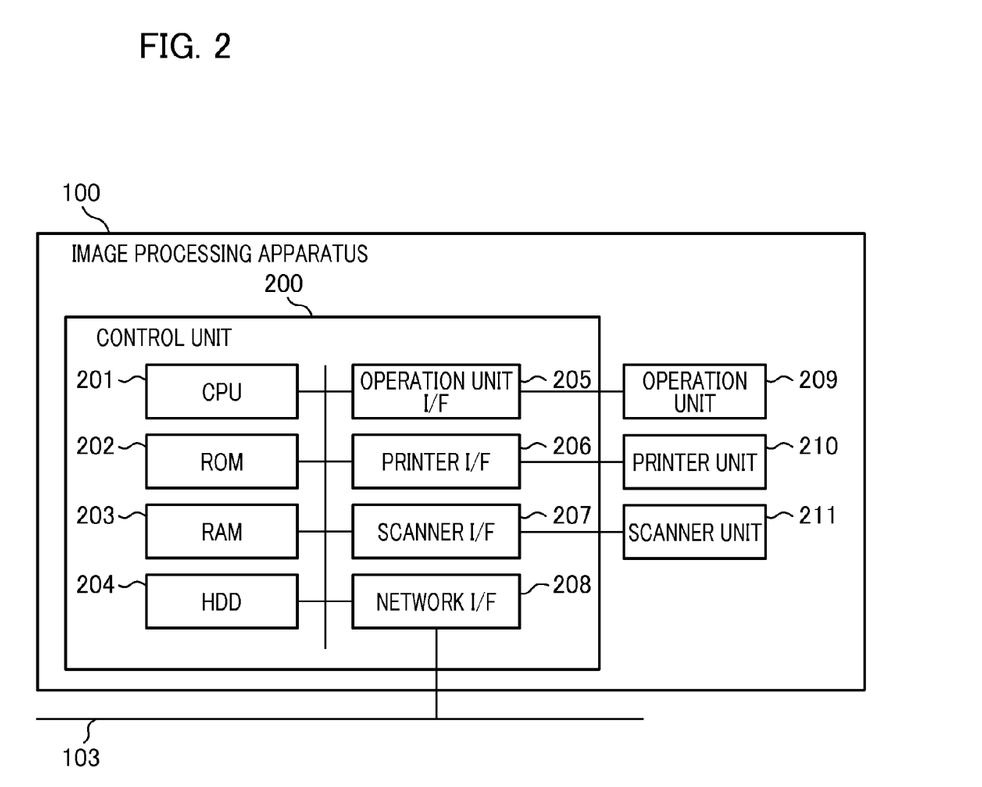
FIG. 2 is a hardware block diagram illustrating the configuration of an image processing apparatus.

FIG. 2 is an example of a hardware block diagram illustrating the configuration of an image processing apparatus. The image processing apparatus 100 includes a control unit 200, an operation unit 209, a printer unit 210, and a scanner unit 211. The control unit 200 controls the image processing apparatus 100 overall. The operation unit 209 inputs and displays various types of information according to user's operations.

The control unit 200 includes CPU 201, ROM 202, RAM 203, and HDD 204. "CPU" is the abbreviation for "Central Processing Unit". "ROM" is the abbreviation for "Read Only Memory". "RAM" is the abbreviation for "Random Access Memory". "HDD" is the abbreviation for "Hard Disk Drive". The control unit 200 also includes an operation unit I/F (Interface) 205, a printer I/F 206, a scanner I/F 207, and a network I/F 208.

The CPU 201 reads out a control program stored in the ROM 202 and executes various control processes such as read control and transmission control processing. The RAM 203 is used as a temporary storage area, such as the main memory of the CPU 201 or a work area. The HDD 204 stores image data and various programs or various information tables. The HDD 204 also stores video data that shows a maintenance procedure for a failure (for example, a jam) that occurs in the image processing apparatus 100. A video corresponding to such video data is referred to as a "maintenance video".

The operation unit I/F 205 connects the operation unit 209 to the control unit 200. The operation unit 209 includes a liquid crystal display section having a touch panel function, and a keyboard. When a user operates a keyboard, the operation unit I/F 205 acquires the operation content. In addition, the operation unit I/F 205 transfers the acquired operation content to the CPU 201. The CPU 201 generates display screen data based on the transferred operation content and the above described control program.

The printer I/F 206 connects the printer unit 210 to the control unit 200. The control unit 200 transfers image data that is to be printed by the printer unit 210 via the printer I/F 206 to the printer unit 210. Then, the printer unit 210 prints out the image data on a recording medium.

The scanner I/F 207 connects the scanner unit 211 to the control unit 200. The scanner unit 211 reads an image of an original to generate the image data, and inputs the data via the scanner I/F 207 to the control unit 200. The network I/F 208 connects the control unit 200 (image processing apparatus 100) to the LAN 103. The network I/F 208 sends and receives various information to/from the other apparatus on the LAN 103.

Figure 3:
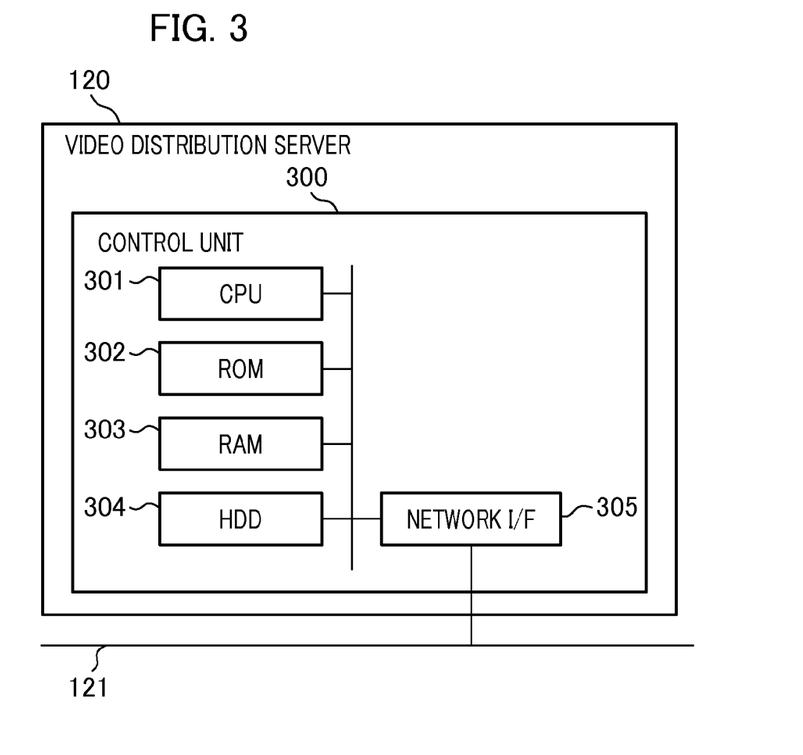
FIG. 3 is a diagram illustrating an example of the configuration of a video distribution server.

FIG. 3 is a diagram illustrating an example of the configuration of a video distribution server. The video distribution server 120 includes a control unit 300. The control unit 300 controls the video distribution server 120 overall. The control unit 300 includes CPU 301, ROM 302, RAM 303, HDD 304, and a network I/F 305.

The CPU 301 reads a control program stored in the ROM 302 and executes various control processes. The RAM 303 is used as a temporary storage area for the main memory of the CPU 301 or a work area or the like. The HDD 304 stores image data and various programs. The HDD 304 also stores video data that shows a maintenance procedure for a jam that occurs in an accessory device. The network I/F 305 connects the control unit 300 to the LAN 121. The network I/F 305 sends and receives various information to/from the other apparatus on the LAN 121.

Figure 4:
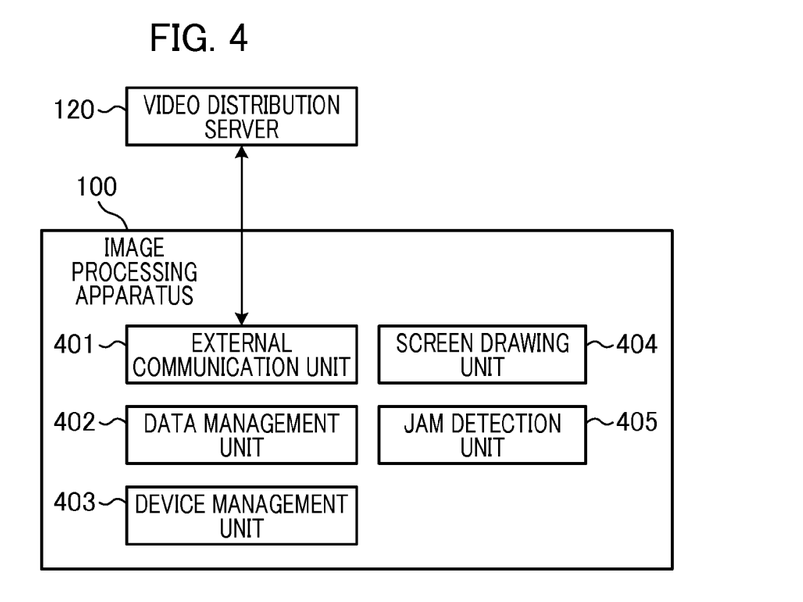
FIG. 4 is a diagram illustrating an example of the software configuration of an entire system.

FIG. 4 is a diagram illustrating an example of the software configuration of an entire system including an image processing apparatus. Each function unit of the image processing apparatus 100 shown in FIG. 4 is implemented by causing the CPU 201 to load a computer program stored in the ROM 202 or the HDD 204 into the RAM 203 and to execute the program in the image processing apparatus 100. In addition, a control method of the image processing apparatus according to this embodiment is implemented by each function unit shown in FIG. 4.

The image processing apparatus 100 includes an external communication unit 401, a data management unit 402, a device management unit 403, a screen drawing unit 404, and a jam detection unit 405. The external communication unit 401 communicates with the video distribution server 120 via the Internet 110 in order to download video data from the video distribution server 120.

The data management unit 402 manages document data stored in the RAM 203 or the HDD 204, application data, video data received from the video distribution server 120, and the like. In addition, the data management unit 402 calculates the free space in the RAM 203 or the HDD 204.

The device management unit 403 manages the configuration of an accessory device of the image processing apparatus 100. The device management unit 403 detects that an accessory device has been attached or detached to/from the image processing apparatus 100 and stores the information in the RAM 203 or the HDD 204.

The screen drawing unit 404 generates a screen displayed on the operation unit 209 and displays the generated screen on the operation unit 209. In addition, the screen drawing unit 404 displays and reproduces video data that is managed by the data management unit 402, on the operation unit 209. The jam detection unit 405 detects a jam that has occurred inside the image processing apparatus 100. The jam is, for example, a paper jam. In addition, the jam detection unit 405 specifies the location at which the jam has occurred and stores the information about the location at which the jam has occurred in the RAM 203 or the HDD 204. Further, the jam detection unit 405 detects whether or not the jam has been cleared. In the present embodiment, a jam is one example of the failures that occur in the image processing apparatus 100, and the jam detection unit 405 can detect the occurrence of any failure such as toner shortage that prevents the image processing apparatus 100 from printing, or whether or not the failure has been eliminated.

Figure 5:
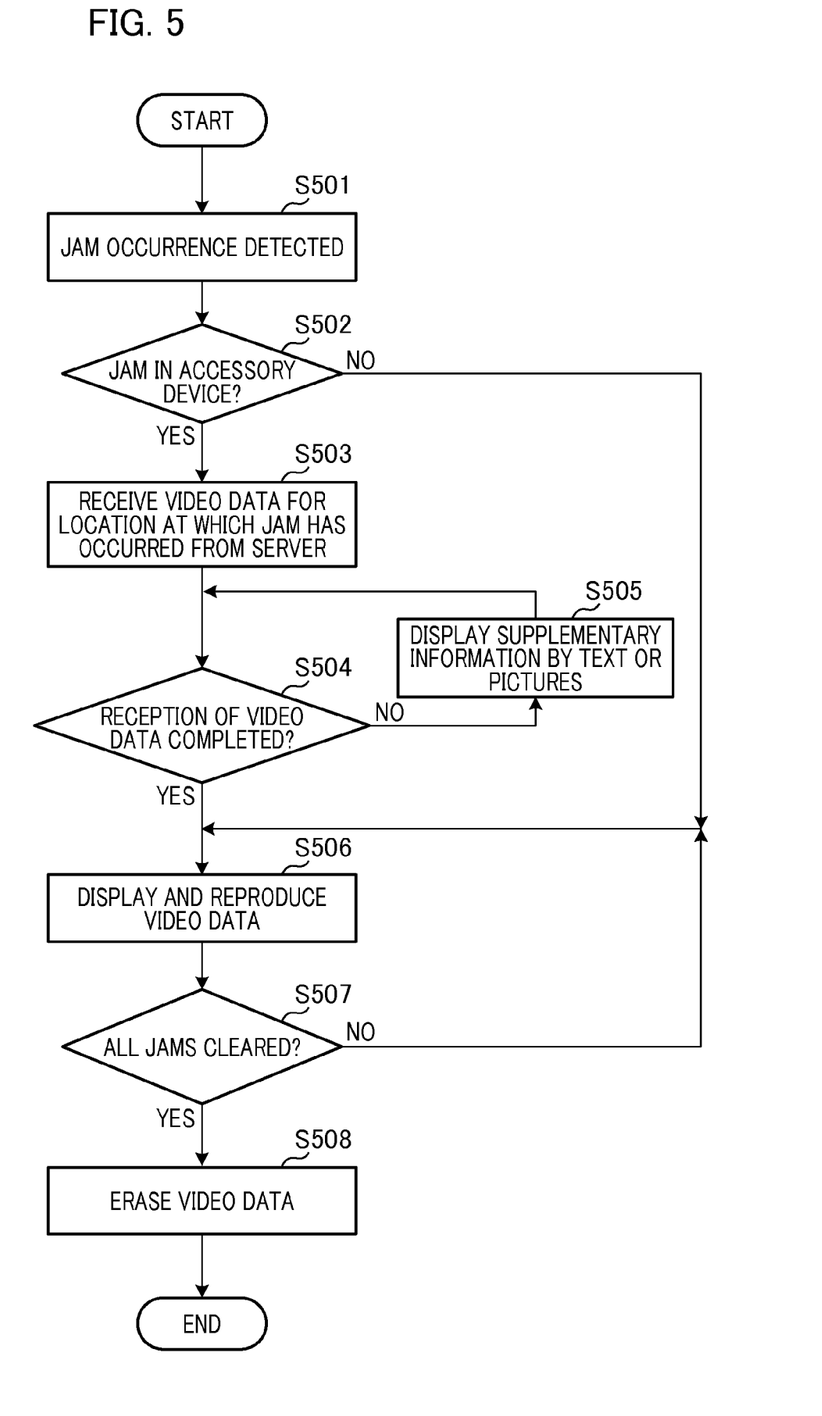
FIG. 5 is a flowchart illustrating an example of the operation processing of an image processing apparatus.

FIG. 5 is a flowchart illustrating an example of the operation processing of the image processing apparatus in the first embodiment. Each operation shown in the flowchart of FIG. 5 is implemented by causing the CPU 201 of the image processing apparatus 100 to load a control program stored in the ROM 202 or the HDD 204 into the RAM 203 and to execute the program. In addition, each operation as described above is implemented by causing the CPU 301 of the video distribution server 120 to load a control program stored in the ROM 302 or the HDD 304 into the RAM 303 and to execute the program.

First, the jam detection unit 405 detects a jam that has occurred inside the image processing apparatus 100, and stores the information about the location at which the jam has occurred in the RAM 203 or the HDD 204 (step S501).

Next, the jam detection unit 405 determines whether or not the location at which the jam has been detected in step S501 is in an accessory device (step S502). The jam detection unit 405 is a first determination unit. When the jam detection unit 405 determines that the location at which the jam has occurred is in an accessory device, the processing proceeds to S503. When the jam detection unit 405 determines that the location at which the jam has occurred is not in an accessory device, the processing proceeds to step S506.

In step S503, the external communication unit 401 requests a maintenance procedure for the location at which the jam has occurred, that is, video data (maintenance video) that shows a procedure of processing for clearing the jam, to the video distribution server 120. For example, when a jam has occurred in the paper feeding deck 101, the external communication unit 401 requests a maintenance video by sending a message that a jam has occurred in the paper feeding deck 101, to the video distribution server 120. Then, the external communication unit 401 receives the maintenance video corresponding to the above request from the video distribution server 120. The data management unit 402 stores the received maintenance video in the RAM 203 or the HDD 204.

When the external communication unit 401 makes a request for video data to the video distribution server 120, the image quality of the requested video data can be changed according to the line condition of the LAN 103 and/or the LAN 121 and/or the free space of the RAM 203 and/or the HDD 204. The term "image quality of video data" refers to a parameter or state of video data, such as frame rate, bit rate, codec, or resolution. For example, the external communication unit 401 calculates in advance the time to be taken for receiving data from the video distribution server 120, and changes the image quality of the requested video data according to the calculated time. In addition, the data management unit 402 calculates in advance the free space in the RAM 203 and/or the HDD 204, and changes the image quality of the requested video data accordingly. Thus, the data amount received by the external communication unit 401 can be adjusted depending on the situation. Note that the line condition of the LAN 103 and/or the LAN 121 and/or the free space of the RAM 203 and/or the HDD 204 may be input in advance by a user.

Next, the external communication unit 401 determines whether or not the reception of video data sent from the video distribution server 120 in step S503 has been completed (step S504). The external communication unit 401 is a second determination unit. When the external communication unit 401 determines that the reception of the video data has been completed, the processing proceeds to S506. When the external communication unit 401 determines that the reception of the video data has not been completed, the processing proceeds to S505.

In step S505, the screen drawing unit 404 displays supplementary information about maintenance in the form of characters or pictures on the operation unit 209 (step S505). Then, the processing returns to step S504.

Figure 6A:
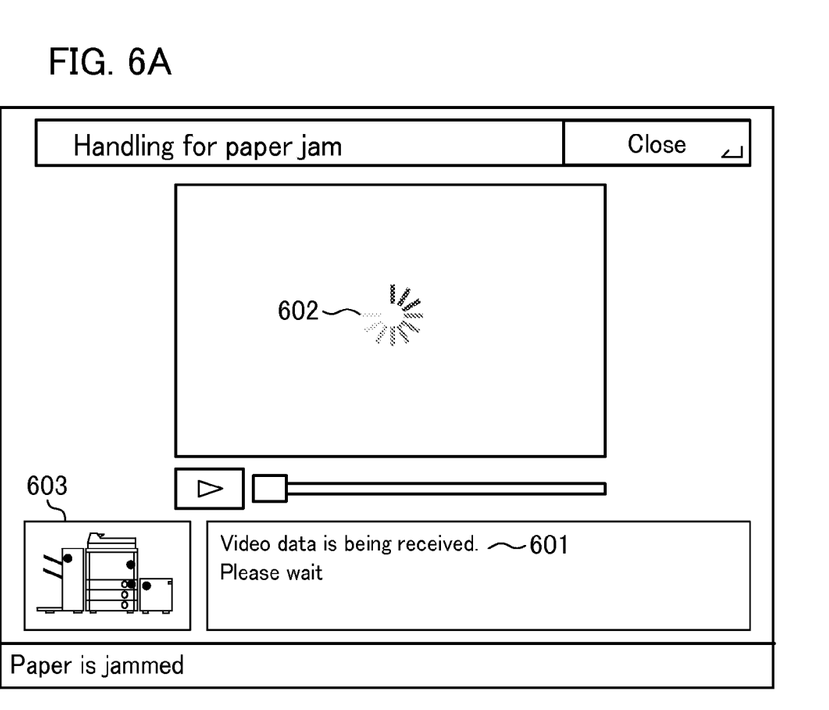
FIGS. 6A and 6B are diagrams illustrating examples of screens that display supplementary information.

FIGS. 6A and 6B are diagrams illustrating examples of screens that display supplementary information. A message 601 and an icon 602 on the screen shown in FIG. 6A are supplementary information for instructing a user to wait until the reception of video data has been completed. An icon 603 shows that jams have occurred in the image processing apparatus 100, the paper feeding deck 101, and the finisher 102.

Figure 6B:
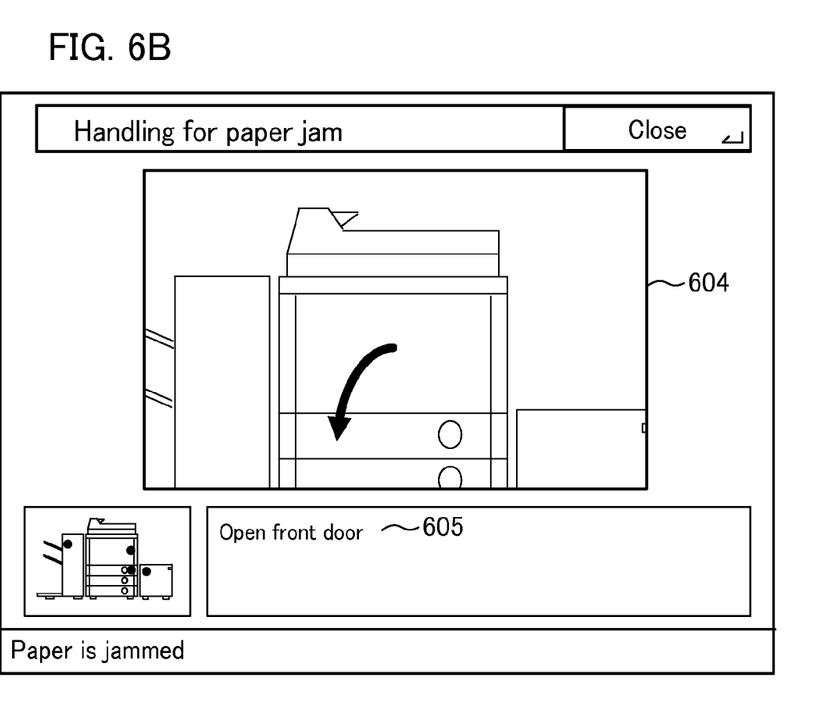

In addition, the screen shown in FIG. 6B shows a procedure for clearing a jam by an illustration 604 and a message 605. Note that the procedure for clearing a jam may be shown by an alternative means such as pictures or characters until the reception of the video data has been completed.

Returning to FIG. 5, in step S506, the screen drawing unit 404 reads and reproduces a maintenance video stored in the HDD 204 in advance, which shows a maintenance procedure for clearing a jam that has occurred in the image processing apparatus 100, and displays the video on a screen of the operation unit 209 (step S506). In addition, the screen drawing unit 404 reads and reproduces a maintenance video stored in step S503, which shows a maintenance procedure for clearing a jam that has occurred in an accessory device, from the RAM 203 or the HDD 204, and displays the data on a screen of the operation unit 209.

Next, the jam detection unit 405 determines whether or not all jams detected in step S501 have been cleared (step S507). When the jam detection unit 405 determines that all jams have been cleared, the processing proceeds to S508. When the jam detection unit 405 determines that not all jams have been cleared, the processing returns to step S506.

In step S508, the data management unit 402 erases the maintenance video stored in step S503, which shows a maintenance procedure for clearing a jam that has occurred in an accessory device, from the RAM 203 or the HDD 204 (step S508), and the processing ends.

Note that, although in this embodiment the screen drawing unit 404 displays and reproduces video data after the reception of the data has been completed, a similar configuration can be applied to video data for streaming. Specifically, in step S504, before the external communication unit 401 completes the reception of video data, the screen drawing unit 404 can sequentially display and reproduce the video data. This can shorten the time to be taken for receiving video data so as to be displayed and reproduced.

In addition, when the jam detection unit 405 determines that the location at which a jam has been detected is both in the body of the image processing apparatus 100 and an accessory device, and before the external communication unit 401 completes the reception of video data, the screen drawing unit 404 may execute the following processing. The screen drawing unit 404 preferentially reproduces a maintenance video that shows a maintenance procedure for the body of the image processing apparatus 100 while the external communication unit 401 is receiving video data. In this case, the screen drawing unit 404 may store the priority for displaying and reproducing video data, and raise the priority of the video data the reception of which has been completed. This can eliminate waiting time of a user for receiving the video data so as to be displayed and reproduced.

According to the present embodiment, the occurrence of a jam in an accessory device causes the image processing apparatus to acquire and reproduce a maintenance video from the video distribution server, and the elimination of this jam causes the above described maintenance video to be erased. Therefore, according to the present embodiment, the image processing apparatus can reproduce and display a video that shows a maintenance procedure for eliminating a failure that has occurred while an accessory device is attached to the body of the image processing apparatus without requiring a very large storage area.

Second Embodiment

Next, a second embodiment will be described. According to the second embodiment, a change of the configuration of an accessory device causes the image processing apparatus to receive and store video data corresponding to the configuration. Here, only the difference between the first embodiment and the second embodiment will be described.

Figure 7:
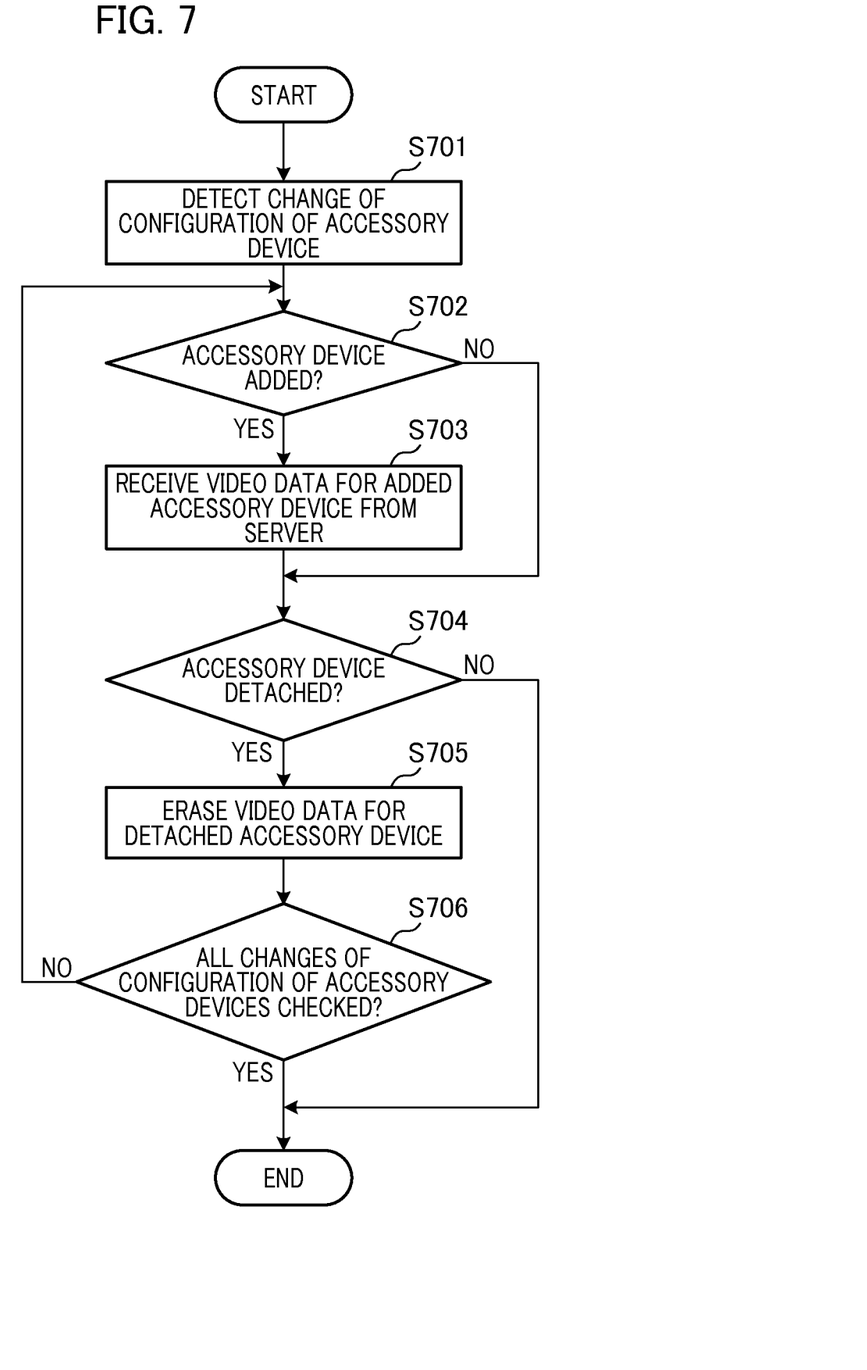
FIG. 7 is a flowchart illustrating an example of the operation processing of an image processing apparatus.

FIG. 7 is a flowchart illustrating an example of the operation processing of the image processing apparatus according to the second embodiment. Each operation shown in the flowchart of FIG. 7 is implemented by causing the CPU 201 of the image processing apparatus 100 to load a control program stored in the ROM 202 or the HDD 204 into the RAM 203 and to execute the program. In addition, each operation process described above is implemented by causing the CPU 301 of the video distribution server 120 to load a control program stored in the ROM 302 or the HDD 304 to the RAM 303 and to execute the program.

Firstly, the device management unit 403 detects a change in the configuration of an accessory device attached to the image processing apparatus 100, and stores the information in the RAM 203 or the HDD 204 (step S701). Then, the device management unit 403 determines whether or not the change in the configuration of an accessory device detected in step S701 is the addition of an accessory device (step S702). Specifically, the device management unit 403 detects the addition of an accessory device to the body of the image processing apparatus 100.

When the device management unit 403 determines that a change of the configuration of an accessory device is the addition of an accessory device, the processing proceeds to S703. The device management unit 403 determines that a change in the configuration of an accessory device is not the addition of an accessory device, the processing proceeds to S704.

In step S703, the external communication unit 401 requests a video that shows a maintenance procedure (maintenance video) for the accessory device for which a change in the configuration was determined to be the addition thereof in step S702, to the video distribution server 120. Thereby, the external communication unit 401 receives the maintenance video corresponding to the request from the video distribution server 120.

Now, the processing of step S703 will be specifically described. For example, when the paper feeding deck 101 is added to the image processing apparatus, the external communication unit 401 sends a message that the paper feeding deck 101 has been added to the image processing apparatus to the video distribution server 120. In addition, the external communication unit 401 receives video data sent from the video distribution server 120 in response to the request. Then, the data management unit 402 stores the received video data in the RAM 203 or the HDD 204. Here, when the external communication unit 401 makes a request for video data to the video distribution server 120, the image quality of the requested video data may be changed according to the free space of the RAM 203 and/or the HDD 204.

In step S704, the device management unit 403 determines whether or not the change in the configuration of an accessory device detected in step S701 is the detachment of an accessory device. When the device management unit 403 determines that the change is the detachment of an accessory device, the processing proceeds to S705. When the device management unit 403 determines that the change is not the detachment of an accessory device, the processing proceeds to S706.

In step S705, the data management unit 402 erases the video data that shows a maintenance procedure for the accessory device, a change of the configuration which has been determined to be a detachment thereof in step S704, from the RAM 203 or the HDD 204.

In step S706, the device management unit 403 determines whether or not all changes in the configuration of the accessory devices in the image processing apparatus 100 have been checked. When the device management unit 403 determines that all changes have been checked, the processing ends. When the device management unit 403 determines that not all changes have been checked, the processing returns to step S702 and is repeated until all changes in the configuration of the accessory devices have been checked.

Note that the image processing apparatus 100 may perform the processing shown in a flowchart of FIG. 7 immediately after a change in the configuration of an accessory device has been detected, or at every fixed period of time, or at any timing instructed by a user. In addition, the image processing apparatus 100 may perform the processing shown in the flowchart of FIG. 7 at any timing after predetermined processing has been performed, such as when the image processing apparatus 100 has been activated or a jam has occurred.

Figure 8:
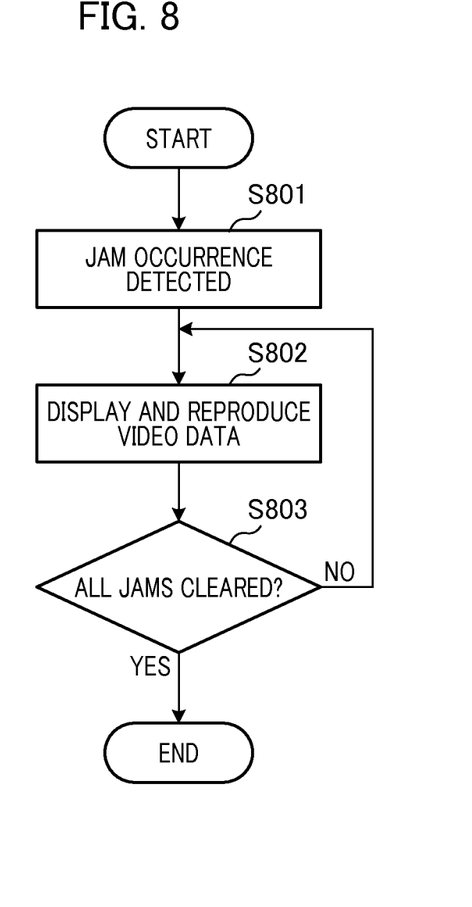
FIG. 8 is a flowchart illustrating the processing for reproducing video data that shows a maintenance procedure.

FIG. 8 is a flowchart illustrating the processing for reproducing video data that shows a maintenance procedure in the second embodiment. Each operation shown in the flowchart of FIG. 8 is implemented by causing the CPU 201 of the image processing apparatus 100 to load a control program stored in the ROM 202 or the HDD 204 into the RAM 203 and to execute the program. As step S801 is similar to step S501 of FIG. 5, the explanation thereof is omitted.

In step S802, the screen drawing unit 404 reads video data stored in the HDD 204 in advance that shows a maintenance procedure for eliminating a failure that has occurred in the image processing apparatus 100, and displays and reproduces the data on the operation unit 209. In addition, the screen drawing unit 404 reads the video data received and stored in step S703 of FIG. 7 which shows a maintenance procedure for eliminating a failure that has occurred in an accessory device from the RAM 203 or the HDD 204, and displays and reproduces the data on the operation unit 209.

Next, the jam detection unit 405 determines whether or not all the jams detected in step S801 have been cleared (step S803). When the jam detection unit 405 determines that all jams have been cleared, the processing ends. When the jam detection unit 405 determines that not all jams have been cleared, the processing returns to step S801.

According to the second embodiment, the addition of an accessory device can cause the image processing apparatus to receive and store a maintenance video corresponding to an accessory device from the video distribution server 120. This can eliminate waiting time of a user for receiving a maintenance video so as to be displayed and reproduced when maintenance becomes necessary. In addition, according to the second embodiment, the detachment of an accessory device from the image processing apparatus causes a maintenance video corresponding to an accessory device to be erased. Thus, the image processing apparatus can reproduce and display a maintenance video corresponding to an accessory device without requiring a very large storage area.

Other Embodiment

The present invention can also be implemented by executing the following processing. Specifically, a software (program) that implements the functions of the above described embodiments is provided through a network or various storage media to a system or apparatus, and the computer (or CPU, MPU, or the like) of the system or apparatus reads and executes the program. In this case, the program and storage media storing the program are to constitute the present invention.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-262600 filed on Nov. 30, 2012 which is hereby incorporated by reference herein in its entirety.

What is claimed is:

1. An image processing apparatus capable of communicating with a video distribution apparatus, the apparatus comprising:
   a detection unit configured to detect a failure that has occurred;
   a first determination unit configured to determine whether or not a location at which the failure has been detected is in a peripheral device attached to a body of the image processing apparatus;
   a receiving unit configured to receive video data that shows a procedure of processing for eliminating the failure that has occurred in the peripheral device from the video distribution apparatus and to store the video data in a storage unit when the first determination unit determines that the location at which the failure has been detected is in the peripheral device attached to the body of the image processing apparatus; and
   a display unit configured to reproduce and display the video data stored in the storage unit on a screen.

2. The image processing apparatus according to claim 1, wherein the detection unit can detect the elimination of the failure, the apparatus further comprising:
   an erasing unit configured to erase the video data displayed on the screen by the display unit from the storage unit when the detection unit detects that the failure has been eliminated.

3. The image processing apparatus according to claim 1, comprising a second determination unit configured to determine whether or not a reception of the video data by the receiving unit has been completed, wherein the display unit displays supplementary information about the processing for eliminating the failure on the screen when the second determination unit determines that the reception of the video data by the receiving unit has not been completed.

4. The image processing apparatus according to claim 3, wherein the display unit reproduces a video data that shows the procedure of processing for eliminating the failure that has occurred in the body of the image processing apparatus when the first determination unit determines that the location at which the failure has been detected is both in the body of the image processing apparatus and the peripheral device and when the second determination unit determines that the reception of the video data by the receiving unit is not completed.

5. The image processing apparatus according to claim 1, wherein the display unit reproduces and displays a video data that shows a procedure of processing for eliminating the failure that has occurred in the body of the image processing apparatus stored in the storage unit in advance on a screen when the first determination unit determines that the location at which the failure has been detected is not in the peripheral device attached to the body of the image processing apparatus.

6. The image processing apparatus according to claim 1, wherein the peripheral device attached to the body of the image processing apparatus is at least one of a post processing device for post processing and a paper feeding device for feeding papers.

7. The image processing apparatus according to claim 1, wherein the receiving unit changes an image quality of the video data received from the video distribution apparatus according to a time measured in advance to be taken for receiving the data from the video distribution apparatus.

8. The image processing apparatus according to claim 1, wherein the receiving unit changes an image quality of the video data received from the video distribution apparatus according to a free space in the storage unit.

9. The image processing apparatus according to claim 1, wherein the failure detected by the detection unit is a paper jam or toner shortage.

10. The image processing apparatus according to claim 1, wherein the image processing apparatus is at least one of a printing apparatus and a facsimile apparatus.

11. An image processing apparatus capable of communicating with a video distribution apparatus via a network, the apparatus comprising:
    a detection unit configured to detect an addition of a peripheral device to a body of the image processing apparatus,
    a receiving unit configured to receive video data that shows a procedure of processing for eliminating a failure that has occurred in the peripheral device from the video distribution apparatus and to store the video data in a storage unit when the detection unit detects the addition of the peripheral device to the body of the image processing apparatus, and
    a display unit configured to reproduce and display the video data stored in the storage unit on a screen when the failure has occurred in the peripheral device.

12. The image processing apparatus according to claim 11, wherein the detection unit can detect the removal of the peripheral device from the body of the image processing apparatus, the apparatus further comprising:
    an erasing unit configured to erase the video data stored in the storage unit when the detection unit detects that the peripheral device has been removed from the body of the image processing apparatus.

13. A control method for an image processing apparatus capable of communicating with a video distribution apparatus via a network, the method comprising:
    detecting a failure that has occurred;
    determining whether or not a location at which the failure has been detected is in a peripheral device attached to a body of the image processing apparatus;
    receiving video data that shows a procedure of processing for eliminating the failure that has occurred in the peripheral device from the video distribution apparatus and storing the data in a storage unit when it is determined that the location at which the failure has been detected is in the peripheral device attached to the body of the image processing apparatus; and
    reproducing and displaying the video data stored in the storage unit on a screen.

14. A non-transitory storage media storing a readable program that causes a computer to execute the control method according to claim 13.

15. A control method for an image processing apparatus capable of communicating with a video distribution apparatus via a network, the method comprising:
- detecting the addition of a peripheral device to the body of the image processing apparatus,
- receiving video data that shows a procedure of processing for eliminating a failure that has occurred in the peripheral device from the video distribution apparatus and storing the data in a storage unit when the addition of the peripheral device to the body of the image processing apparatus is detected; and
- reproducing and displaying the video data stored in the storage unit on a screen when the failure has occurred in the peripheral device.

16. A non-transitory storage media storing a readable program that causes a computer to execute the control method according to claim 15.

* * * * *